United States Patent [19]

Lederman

[11] Patent Number: 4,541,742

[45] Date of Patent: Sep. 17, 1985

[54] UNITIZED STEERING COLUMN BEARING ASSEMBLY

[75] Inventor: Frederick E. Lederman, Sandusky, Ohio

[73] Assignee: General Motors Corporation, Detroit, Mich.

[21] Appl. No.: 490,576

[22] Filed: May 2, 1983

[51] Int. Cl.$^4$ .................... F16C 33/58; F16C 33/44
[52] U.S. Cl. ..................... 384/518; 384/526
[58] Field of Search ............... 308/189 A, 189 R, 197, 308/193, 207 A; 280/779, 780; 180/78; 74/484, 485, 490, 492; 384/518, 517, 510, 499, 500, 504, 523, 526

[56] References Cited

U.S. PATENT DOCUMENTS

| | | | |
|---|---|---|---|
| 1,097,430 | 5/1914 | Heckman | 308/189 A |
| 2,164,497 | 7/1939 | Chamberlin | |
| 2,387,105 | 10/1945 | Yager | 308/189 R |
| 2,786,954 | 3/1957 | Atlee | 308/189 R |
| 3,649,094 | 3/1972 | Russell | 308/201 |
| 3,943,803 | 3/1976 | Hafla | 308/189 A X |
| 4,029,168 | 6/1977 | Kramer | 180/114 |
| 4,173,376 | 11/1979 | Standing et al. | 308/189 A |

FOREIGN PATENT DOCUMENTS

| | | | |
|---|---|---|---|
| 77742 | 3/1962 | France | 308/189 A |
| 446865 | 3/1949 | Italy | 308/190 |
| 696620 | 9/1953 | United Kingdom | 308/190 |

*Primary Examiner*—Stuart S. Levy
*Assistant Examiner*—Thomas R. Hannon
*Attorney, Agent, or Firm*—Patrick M. Griffin

[57] ABSTRACT

A bearing assembly for a steering column includes an axially spaced pair of stamped, angular contact ball bearings with raceways terminating on the ball circle and at least an outer cylindrical support member engageable with the mast jacket of the steering column. A spring or springs contained in the annular space between the ball circles of the bearings and the housing or between the ball circles and the steering shaft serve to preload the ball bearings as well as to bias them into stop members on the support to maintain the bearings and support as a separately handled unit.

3 Claims, 2 Drawing Figures

UNITIZED STEERING COLUMN BEARING ASSEMBLY

This invention relates to unitized bearing assemblies and specifically to a unitized bearing assembly for supporting the shaft of a steering system within the mast jacket of a steering column.

BACKGROUND OF THE INVENTION

Currently, certain steering shafts are supported within mast jackets by duplexed pair of angular contact bearings having coined or ground inner and outer races with a complement of caged balls therebetween. In assembly, each outer race, which has a complement of caged balls snap fitted thereto, is separately set into place against a shoulder in the mast jacket, or steering column housing. Next, one inner race member is fitted to the shaft and the shaft is passed through the housing and through the outer races until the inner race seats on the caged balls of one of the outer races. Next, the other inner race is fitted over the shaft and then into engagement with the caged balls of the other outer race. Then, a spring and clamping ring is fitted against the last assembled inner race to preload it and maintain it in axial position. While this provides the required bearing support of the shaft in the mast jacket, it may be desirable from a time and cost standpoint to eliminate the separate parts and separate assembly steps and replace them with a unitized bearing assembly or package.

While Chamberlin, U.S. Pat. No. 2,164,497, shows a unitized assembly which lacks axial and radial symmetry, it is undesirable for final assembly. The raceways and the cylindrical supports which seat on the shaft and the mast jacket are integrally formed, which would necessitate forming the whole package from expensive bearing quality steel. Also, the manufacture of the ball and raceway portion of the assembly could not be separated from the assembly of the rest of the package.

SUMMARY OF THE INVENTION

The subject invention provides a unitized bearing assembly which supports a duplexed pair of axially and radially symmetrical angular contact ball bearings in a package, and include force transfer tubes cooperating between the bearings and the support members to allow the package to be easily set in place.

Two embodiments of the invention are disclosed. The first embodiment includes a pair of DF duplexed angular contact ball bearings having stamped inner and outer races, each of which terminates just short of an imaginary cylindrical surface intersecting the ball circle of each ball complement, thus allowing each inner and outer race to be stamped from a single blank. Each ball complement is held by a separator cage including a pair of oppositely directed snap shoulders, each of which snap fits with a race to make each ball bearing a separately unitized and separately handled unit.

The rest of the unitized bearing assembly includes an outer cylindrical support, the opposite ends of which are rolled over each outer race to provide a pair of axiallly separated stop members. The outer support is frictionally engageable with the wall of a cylindrical bore in the mast jacket of the steering column, while the inner races are frictionally engageable with the outer surface of an axial portion of the steering shaft, thus coaxially locating the shaft within the bore. A coil spring located coaxially with the shaft in the annular space between the surface of the shaft and the imaginary cylindrical surface bears against the inner races and biases them axially apart, the force being transmitted throughthe ball bearings into the stop members of the outer cylindrical support. Thus, the spring acts both to preload the ball bearings and to maintain them and the other components as a unitized package. In addition, a cylindrical force transfer tube surrounds the spring and is seated between the inner races to transmit force from one to the other to aid in the placement of the assembly on the shaft.

A second embodiment includes a pair of similar angular contact ball bearings, but arranged in a DB duplex pattern. Each inner and outer race is also integrally stamped, and the outer race of each bearing includes a radially outermost peripheral shoulder engageable with an end of an outer cylindrical support. An inner cylindrical support is fitted through each inner race and extends axially beyond each end of the cylindrical outer support. A compression spring is seated between the inner race of each bearing and an additional stop member at each end of the inner cylindrical support. Each spring is located in the annular space between the inner cylindrical support and the imaginary clindrical surface intersecting the ball circles. The springs bias the inner races axially toward one another, the force being transmitted through the ball bearings, and finally into the ends of the outer support. As before, this preloads the ball bearings and maintains them with the supports as a unitized package. The inner cylindrical support is frictionally engaged over a portion of the shaft and the outer cylindrical support seats on the wall of a cylindrical bore in the steering column housing to support the steering shaft in similar fashion.

It is, therefore, an object of the invention to provide a unitized and preloaded bearing to support a shaft within a housing in which a pair of separate, axially spaced ball bearings are maintained in a unitized assembly with cylindrical support members by the force of preload springs acting between the races and the support members.

It is yet another object of the invention to provide such a bearing assembly which is both axially and radially symmetrical.

It is still a further object of the invention to provide such a bearing in which force transfer tubes cooperable with the ball bearing races and the support members allow the package to be easily set in place.

BRIEF DESCRIPTION OF THE DRAWINGS

These and other objects of the invention will appear from the following written description and drawings in which.

DESCRIPTION OF THE PREFERRED EMBODIMENT

Figure 1:
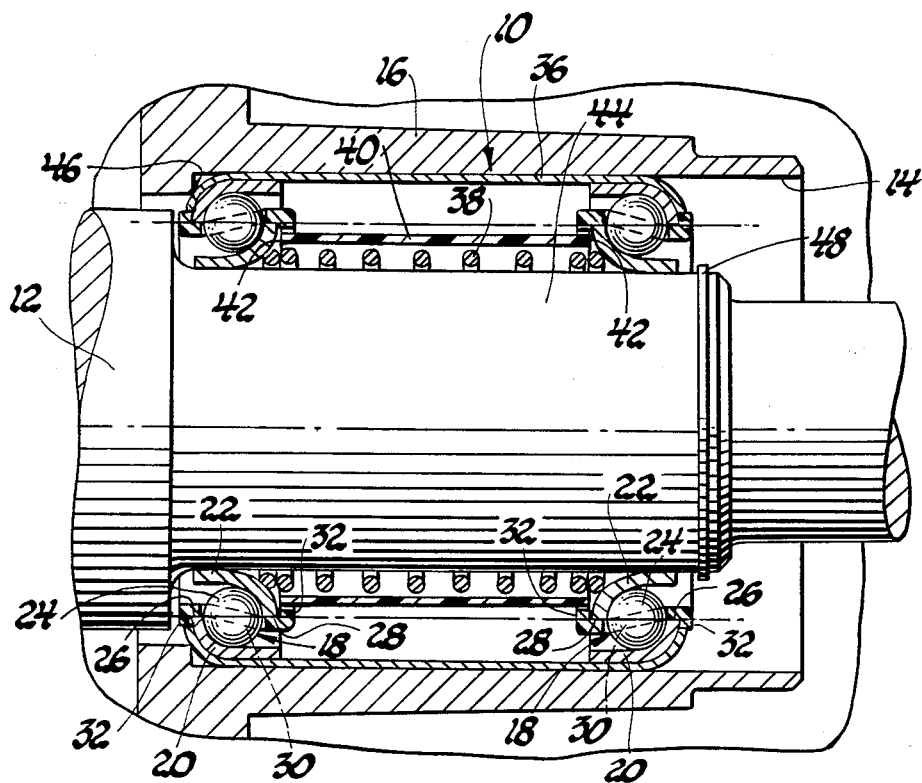
FIG. 1 is a view of a portion of a steering shaft supported within a housing of the steering column by a bearing assembly according to one embodiment of the invention.

Referring first to FIG. 1, a first embodiment of the invention shown in cross-section and designated generally at 10 is shown supporting a steering shaft 12 coaxially within a cylindrical bore 14 in the mast jacket or housing 16 of a steering column or the like. Bearing assembly 10 incorporates two levels of unitization which contribute to cost effectiveness and ease of assembly. The components of the bearing assembly will be first described, then the assembly of the unit and its final placement onto the shaft 12 and within housing 16.

Still referring to FIG. 1, the bearing assembly 10 includes two identical and separate angular contact ball bearings, designated generally at 18, arranged in an axially spaced, DF pattern. Each ball bearing 18 includes an outer race 20 and an inner race 22, with a complement of bearing balls 24 being held between the opposed raceways thereof, and defining an imaginary cylindrical surface intersecting the two ball circles, shown in dotted lines. Each pair of outer and inner races 20 and 22 is stamped from a single blank to leave a radially inner edge, designated at 26 and 28 respectively, which terminates just on or just short of the cylindrical surface through the ball circles, shown in dotted lines. Balls 24 are separated and held by a molded plastic cage, designated generally at 30, which has peripheral, oppositely directed snap shoulders 32 which snap fit over respective edges 26 and 28. Thus, each ball bearing 18 is a separate and integral unit which may be separately manufactured by, and its precision maintained by, a bearing manufacturer. The single blank stamping of races 20 and 22 also allows for a minimum use of bearing steel. The remaining components of bearing assembly 10 include an outer cylindrical support 36, cylindrical coil spring 38 and a cylindrical force transfer tube 40. Cylindrical support 36 is formed of any suitable material, which need not be bearing quality steel, and may be a section of tubing or of rolled and hem flanged sheet metal, if desired. Force transfer tube 40, which may be of nylon, metal or any suitable material, is substantially axially coextensive with spring 38 and has an axial length between its ends 42 just short of the desired axial separation between inner races 22. This length of force transfer tube 40 allows snap shoulders 32 to extend slightly axially past ends 42, thereby cooperating to also radially retain force transfer tube 40 to bearings assembly 10.

One end of support 36 is initially rolled over the outside surface of outer race 20 of one bearing 18, terminating on or just short of edge 26 thereof to serve as a positive stop member for race 20. Next, one end of spring 38 and one end 42 of tube 40 are set into engagement with race 22 of the one bearing 18, and the partial assembly may be then set into a suitable fixture for the assembly of the other ball bearing 18. The diameter of spring 38 is such that it will be located in the annular space defined between the cylindrical surface through the ball circles and the outside of a portion of shaft 12. Finally, the other bearing 18 is set into place and pushed axially toward the previously assembled one ball bearing 18 by any suitable press, compressing spring 38 until ends 42 will just clear races 22. The other end of outer cylindrical support 36 is then rolled or crimped over outer race 20 of the other ball bearing 18. Thus, coil spring 38 biases or forces races 22 axially apart, the force being transmitted through balls 24 to the outer races 20 and into the rolled over ends of support 36, which act as stop members to maintain all components as a unitized package or assembly while preloading the ball bearings. It will be seen that this final assembly of bearing assembly 10 may be done by a non-bearing manufacturer, if desired, as the ball bearings 18 are themselves separate and unit handled.

Still referring to FIG. 1, the steering shaft 12 includes a reduced diameter axial portion 44 with an axial length just slightly greater than the axial length of bearing assembly 10. Steering shaft 12 is inserted through cylindrical bore 14 until axial portion 44 is generally coextensive therewith. Then, bearing assembly 10 is inserted into the annular space between shaft portion 44 and cylindrical bore 14, the outside of support 36 frictionally engaging cylindrical bore 14 and the outer surfaces of inner races 22 frictionally engaging the outside of shaft portion 44. A pressing force is applied with any suitable tool to the inner race 22 of the righthand ball bearing 18, the force being transferred through force transfer tube 40 to the lefthand inner race 22 until the lefthand rolled over end of support 36 seats on a shoulder 46 of cylindrical bore 14 and inner race 22 of the lefthand ball bearing 18 stops at the fillet between axial shaft portion 44 and shaft 12. It will be understood that spring 38 must be strong enough to overcome the frictional engagement force of inner races 22 with the outer surface of shaft portion 44 to maintain the preload. This final placement involves a single operation rather than several operations described earlier in conjunction with the prior art. If desired, for further axial retention, a snap ring 48 may be placed in a suitable groove on shaft portion 44.

Figure 2:
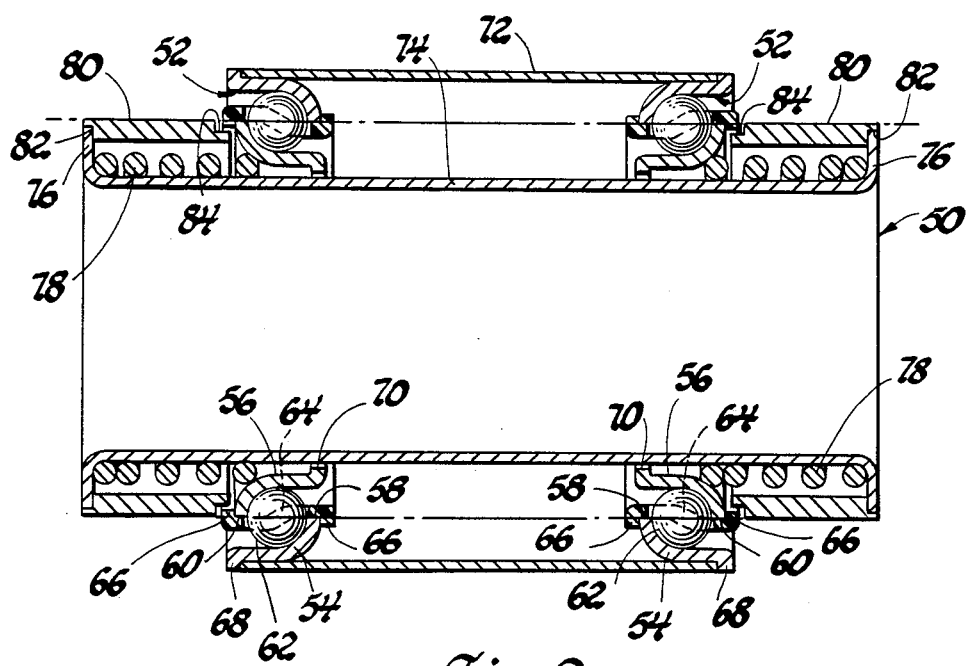
FIG. 2 is a cross-sectional view of another embodiment of the invention removed from its environment.

Referring next to FIG. 2, a second embodiment of the invention which provides the same advantages and features may be seen. The second embodiment, referred to generally at 50, also incorporates two separately handled unitized ball bearings, designated generally 52, each of which has outer and inner races 54 and 56 which have a shape similar to those of the previous embodiment providing angular contact raceways and termininating at radially inner edges 58 and 60 respectively, which lie just on or just short of the ball circles of the complement of balls 62 held therebetween. Balls 62 are held and separated by a cage, designated generally at 64, which has a pair of peripheral, radially oppositely facing snap shoulders 66 which snap fit over edges 58 and 60 to maintain races 54 and 56 together, as in the previous embodiment. A difference from the previous embodiment is that the radially outermost edge of each race 54 and 56 terminates in a peripheral, radially extending shoulder 68 and 70 respectively, for a purpose to be described below.

The remaining components of the second bearing assembly 50 include an outer cylindrical support 72 and an inner cylindrical support 74 which is coaxial with and has an axial length greater than outer support 72. The ends of outer support 72 are engageable with shoulders 68 of outer races 54 and act as stop members. A pair of compression springs 78 are biased between flanges 76 and inner races 56, and are located in the annular space between the imaginary cylindrical surface defined through the ball circles of balls 62 and inner support 74, which is equivalent to the annular space between the cylindrical surface through the ball circles and the shaft, as cylindrical support 74 is fitted closely to the shaft, as will be described.

The preload force of spring 78 is transferred through inner races 56 to balls 62, through outer races 54, and through shoulder 68 to the ends of outer support 72. Thus, springs 78 serve both to preload bearing assembly 52 and to maintain all components as a unitary assembly, as in the previous embodiment. However, because springs 78 press ball bearings 52 toward one another, rather than apart, the arrangement is a duplex pattern of the DB type, rather than the DF type. It is also apparent that the edge of a shoulder 70 is slightly radially spaced from inner support 74. This spacing is sufficient to allow spring 78 to act without friction, but small enough that there will not be significant rattle of the ball bearings 52 within supports 72 and 74. It may, therefore, not be necessary to use as strong a spring 78 as in the previous embodiment. In addition, a pair of force transfer tubes 80, similar to tube 40 of the previous embodiment, may be used if desired. Tubes 80 are substantially axially coextensive with springs 80 and have an axial length slightly less than the axial separation between flanges 76 and inner races 56 and are notched at 82 and 84 respectively to fit over flange 76 and beneath snap shoulders 66 of cage 64, thereby being radially retained to bearing assembly 50.

Assembly of the components of second embodiment 50 is as follows. One flange 76 would be initially turned on inner support 74 and a force transfer tube 80 placed against it. Next, one ball bearing 52 would be set in place against the end of outer support 72 and inner support 74 would be placed through outer support 72 and into a suitable fixture to compress one spring 78. Next, the other ball bearing 52 would be placed in position along with the other transfer tube 80, and the other spring 78 would be compressed, with the other flange 76 being turned as the final step. Placement of the completed bearing assembly 50 into the vehicle would be similar to that of the first embodiment, the main difference being that a longer axial shaft portion would be necessary, one at least as long as the total axial length of inner support 74. The force transfer tubes 80 would transfer the pressing force from inner support 74 through one ball bearing 52 to outer support 72, and through the other ball bearing 52 to the other force transfer tube 80 as the assembly 50 is pressed into place between the shaft and housing.

It will be understood that either embodiment could be varied by locating the compression springs in the annular space between the cylindrical bore and the cylindrical surface through the ball circles. In that event, the duplex arrangement of the one spring first embodiment would become a DB pattern, and that of the two spring second embodiment would become a DF pattern. In addition, the stop members would appear on the inner cylindrical support, rather than the outer cylindrical support, and the springs would press on the outer races.

The embodiments of the invention in which an exclusive property or privilege is claimed are defined as follows:

1. A preassembled, preloaded bearing assembly adapted to be easily assembled and set in place as a unit between a cylindrical bore of a housing and an axial shaft so as to rotatably support said axial shaft in annular spaced coaxial relationship to said cylindrical bore comprising, at least one cylindrical support engageable with one of the shaft and the cylindrical bore and including an axially spaced pair of stop members, a pair of separate ball bearings located in the annular space between the support and the other of the shaft and cylindrical bore, each bearing including inner and outer angular contact races respective to the shaft and cylindrical bore with a circular complement of balls therebetween, said inner and outer races each further including a radially inner edge, said bearings each further including a cage having oppositely directed snap shoulders snap fitted over said radially inner edges to maintain said bearings as separate units that may be handled separately to thereby ease the assembly of said bearing assembly, spring means generally concentric to the coaxis of the shaft and cylindrical bore and located in the annular space between a cylindrical surface through the centers of the complements of balls and the other of the shaft and cylindrical bore, the spring means engaging the races respective the other of the shaft and cylindrical bore and axially biasing the races in axially opposed directions, said axial bias being transmitted through the balls to the other races to bias the other races into the stop members to preload the ball bearings and maintain the support and ball bearings as an axially symmetrical unit separable as a unit from the cylindrical bore and shaft and, a force transfer tube coaxial to and substantially axially coextensive with said spring means and having an axial length sufficient that a snap shoulder fitted over a radially inner edge of said engaged race may extend axially past an end of said force transfer tube, whereby said snap shoulder may also cooperate to radially retain said force transfer tube to, said bearing assembly, and whereby said force transfer tube may also cooperate to transfer pressing force from one ball bearing to the other ball bearing, so that said bearing assembly can be easily set in place as a unit between said cylindrical bore and shaft in a single operation.

2. A preassembled, preloaded bearing assembly adapted to be easily assembled and set in place as a unit between a cylindrical bore of a housing and an axial shaft so as to rotatably support said axial shaft in annular spaced coaxial relationship to said cylindrical bore comprising, an outer cylindrical support engageable with the cylindrical bore and including an axially spaced pair of stop members, a pair of separate ball bearings located in the annular space between the support and cylindrical bore, each bearing including inner and outer angular contact races respective to the shaft and cylindrical wall with a circular complement of balls therebetween, said inner and outer races each further including a radially inner edge, said bearings each further including a cage having oppositely directed snap shoulders snap fitted over said radially inner edges to maintain said bearings as separate units that may be handled separately to thereby ease the assembly of said bearing assembly, spring means generally concentric to the coaxis of the shaft and cylindrical bore and located in the annular space between the shaft and a cylindrical surface through the centers of the complements of balls, the spring means engaging the inner races and biasing them axially apart, said axial bias being transmitted through the balls to the outer races to bias them into the stop members to prelaod the ball bearings and maintain the support and ball bearings as an axially symmetrical unit separable as a unit from said cylindrical bore and shaft and, a force transfer tube coaxial to and substantially axially coextensive with said spring means and having an axial length between its ends just short of the axial separation between said inner races, whereby the snap shoulders snap fitted over said radially inner edges of said inner races may extend axially past the ends of said force transfer tube to thereby also cooperate to radially retain said force transfer tube to said bearing assembly, and whereby said force transfer tube may also cooperate to transfer pressing force from said inner race of one ball bearing to said inner race of the other ball bearing, so that said bearing assembly can be easily set in place as a unit between said cylindrical bore and shaft in a single operation.

3. A preassembled, preloaded bearing assembly adapted to be esily assembled and set in place as a unit between a cylindrical bore of a housing and an axial shaft so as to rotatably support said axial shaft in annular spaced coaxial relationship to said cylindrical bore comprising, inner and outer cylindrical supports engageable with the shaft and the cylindrical bore respectively, each support having an axially spaced pair of stop members, with the inner support extending through the outer support, said inner support and its stop members having a smaller diameter than said outer support so as to form an annular space therewith, a pair of separate ball bearings located in the annular space, each bearing incluing inner and outer angular contact races respective to the inner and outer support with a complement of balls therebetween, said inner and outer races each further including a radially inner edge, said bearings each further including a cage having oppositely directed snap shoulders snap fitted over said radially inner edges to maintain said bearings as separate units that may be handled separately to thereby ease the assembly of said bearing assembly, spring means generally concentric to the coaxis of the shaft and cylindrical bore and located in the annular space between the inner support and a cylindrical surface through the centers of the complements of balls, the spring means engaging each inner race and each inner support stop member to bias the inner races axially toward each other, said axial bias being transmitted through the balls to the outer races to bias the outer races into the outer support stop members to preload the ball bearings and maintain the supports and ball bearings as an axially symmetrical unit separable as a unit from the cylindrical bore and shaft and, a force transfer tube coaxial to and substantially axially coextensive with said spring means and having an axial length slightly less than the axial separation between each said inner support stop member and each said inner race, whereby a snap shoulder fitted over a radially inner edge of said inner race may extend axially past a portion of an end of said force transfer tube to thereby also cooperate to radially retain said force transfer tube to said bearing assembly, and whereby said force transfer tube may also cooperate to transfer pressing force from one inner support to one ball bearing and through the outer support to the other ball bearing, so that said bearing assembly can be easily set in place as a unit between said cylindrical bore and shaft in a single operation.

* * * * *